United States Patent
Cloutier et al.

(10) Patent No.: US 9,875,437 B2
(45) Date of Patent: *Jan. 23, 2018

(54) SYSTEMS AND METHODS FOR DRIVE CIRCUITS FOR DYNAMIC MAGNETIC STRIPE COMMUNICATIONS DEVICES

(71) Applicant: Dynamics Inc., Cheswick, PA (US)

(72) Inventors: Bruce S. Cloutier, Jeannette, PA (US); David Lambeth, Pittsburgh, PA (US); James H. Workley, Imperial, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,036

(22) Filed: Feb. 18, 2016

(65) Prior Publication Data

US 2016/0162713 A1    Jun. 9, 2016

Related U.S. Application Data

(63) Continuation of application No. 14/063,140, filed on Oct. 25, 2013, which is a continuation of application No. 13/028,423, filed on Feb. 16, 2011, now Pat. No. 8,602,312.

(60) Provisional application No. 61/305,021, filed on Feb. 16, 2010.

(51) Int. Cl.
| | |
|---|---|
| *G06K 19/02* | (2006.01) |
| *G06K 19/06* | (2006.01) |
| *G06K 7/10* | (2006.01) |
| *H04W 4/00* | (2009.01) |

(52) U.S. Cl.
CPC ... *G06K 19/06206* (2013.01); *G06K 7/10297* (2013.01); *H04W 4/008* (2013.01)

(58) Field of Classification Search
CPC .................. G06K 19/07749; G06K 19/07771
USPC ......................................... 235/488, 492, 493
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A * | 12/1988 | Burkhardt ........ | G06K 19/07749 235/436 |
| 4,797,542 A | 1/1989 | Hara | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Daniel St Cyr (57) ABSTRACT

Dynamic magnetic stripe communications devices are provided as magnetic stripe emulators. A magnetic stripe emulator may include a coil. Drive circuits may be coupled to this coil in order to produce electromagnetic fields from the coil operable to communicate with a magnetic stripe reader.

20 Claims, 6 Drawing Sheets

(56) References Cited

U.S. PATENT DOCUMENTS

| | | |
|---|---|---|
| 5,038,251 A | 8/1991 | Sugiyama et al. |
| 5,168,520 A | 12/1992 | Weiss |
| 5,237,614 A | 8/1993 | Weiss |
| 5,347,580 A | 9/1994 | Hennige |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,955,961 A | 9/1999 | Wallerstien |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 * | 11/2004 | Wong ............... G06K 7/10336 235/451 |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 * | 1/2007 | Blossom ............ G06K 19/06187 235/380 |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 * | 4/2008 | Liu ..................... G06K 7/0004 235/449 |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,606,764 B1 | 10/2009 | Mancini |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 8,511,548 B1 | 8/2013 | Mori et al. |
| 8,602,312 B2 * | 12/2013 | Cloutier ............ G06K 19/06206 235/488 |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082929 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong et al. |
| 2003/0226899 A1 | 12/2003 | Finkelstein |

(56) References Cited

U.S. PATENT DOCUMENTS

| | | |
|---|---|---|
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0147496 A1 | 6/2008 | Bal et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0112766 A1 | 4/2009 | Hammad et al. |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0214148 A1* | 8/2010 | Kuhn ................ G01S 7/022 342/20 |
| 2011/0028184 A1 | 2/2011 | Cooper |
| 2011/0060640 A1 | 3/2011 | Thompson |
| 2011/0240748 A1 | 10/2011 | Doughty et al. |
| 2012/0150611 A1 | 6/2012 | Isaacson et al. |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

SYSTEMS AND METHODS FOR DRIVE CIRCUITS FOR DYNAMIC MAGNETIC STRIPE COMMUNICATIONS DEVICES

CROSS-REFERENCE TO RELATED APPLICATION

This application is a continuation of U.S. patent application Ser. No. 14/063,140, titled "SYSTEMS AND METHODS FOR DRIVE CIRCUITS FOR DYNAMIC MAGNETIC STRIPE COMMUNICATIONS DEVICES," filed on Oct. 25, 2013, which is a continuation of U.S. patent application Ser. No. 13/028,423, titled "SYSTEMS AND METHODS FOR DRIVE CIRCUITS FOR DYNAMIC MAGNETIC STRIPE COMMUNICATIONS DEVICES," filed on Feb. 16, 2011, which claims the benefit of U.S. Provisional Patent Application No. 61/305,021, titled "SYSTEMS AND METHODS FOR DRIVE CIRCUITS FOR DYNAMIC MAGNETIC STRIPE COMMUNICATIONS DEVICES," filed Feb. 16, 2010, each of which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a merchant code or incentive code. The code may be received by the card via manual input (e.g., onto buttons of the card) or via a wireless transmission (e.g., via light, electromagnetic communications, sound, or other wireless signals). A code may be communicated from a webpage (e.g., via light and/or sound). A card may include a display such that a received code may be visually displayed to a user. In doing so, the user may be provided with a way to select, and use, the code.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

A closed loop linear analog drive circuit may be provided to precisely define the current flow at any and all points in time. In doing so, the closed loop linear analog drive circuit may create any desired electromagnetic field at any time. Accordingly, the accuracy and reliability of a magnetic emulator may be enhanced.

Each track of magnetic stripe information may utilize, for example, a separate instance of a drive circuit coupled to a separate magnetic emulator having a coil. Enabling circuitry may be coupled to one or more drive circuits and/or magnetic emulators to enable the use of such components.

An input signal may be provided from, for example, a microprocessor or other circuitry. Several microprocessors may, for example, be included on a card or other device (e.g., a mobile telephonic device). A ramp generator may be provided, for example, to convert a positive or negative going level transition of an input signal into either a positive going or negative going linear ramp of defined slope. This signal of, for example, alternative positive and negative ramps may be passed to additional signal processing circuitry.

Signal shaping circuitry may be provided and may, for example, receive the signal provided by the ramp generator. The signal shaping circuitry may be utilized to shape the ramp signals provided by the ramp generator.

The shaped signals may be provided to current control circuitry. The current control circuit may be utilized, for example, to control the level of current at an output node.

A control input may be provided, for example, that provides a muting function. When such a control signal is pulled high to the supply voltage, for example, the drive current may be forced to approximately OA (e.g., OA). Such a muting function may be utilized, for example, to silence a dynamic magnetic stripe communications device during power-up and power-down of the drive circuits. When such circuits are not in use, for example, power may be removed to increase battery life. During a power transition, for example, the mute function may prevent unwanted signals (e.g., pulses) from being generated.

A reference voltage may be utilized by a voltage regulator. In doing so, for example, the dependence on a supply voltage may be eliminated. For example, a battery may be supercharged and this battery may have different voltage levels during the battery's use. A reference voltage provided from a voltage regulator may, for example, provide a more reliable source of electrical energy.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
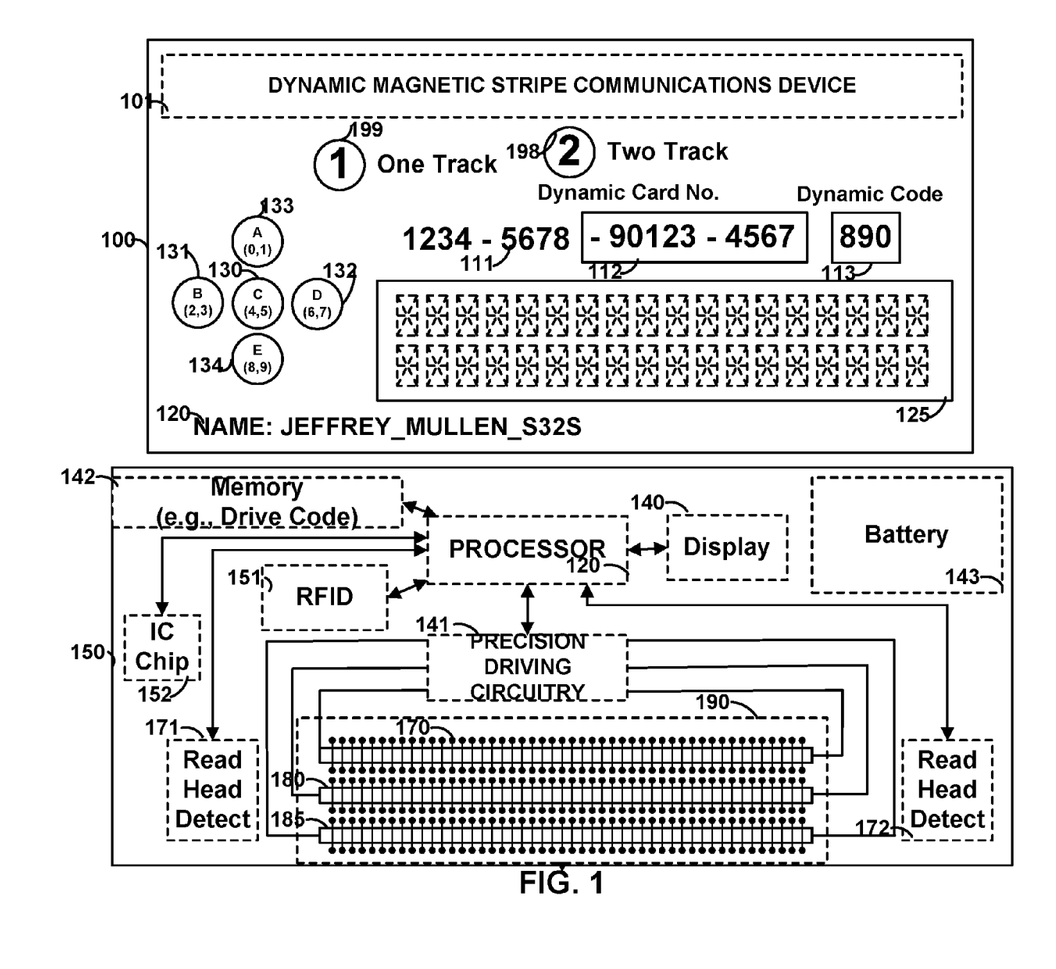
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Card 100 may include button 199. Button 199 may be used, for example, to communicate information through dynamic magnetic stripe communications device 101 indicative of a user's desire to communicate a single track of magnetic stripe information. Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate two tracks of magnetic stripe data). Multiple buttons may be provided on a card and each button may be associated with a different user selection.

Architecture 150 may be utilized with any card. Architecture 150 may include processor 120. Processor 120 may have on-board memory for storing information (e.g., drive code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may store discretionary data codes associated with buttons of card 150. Such codes may be recognized by remote servers to effect particular actions. For example, a code may be stored on memory 142 that causes a promotion to be implemented by a remote server (e.g., a remote server coupled to a card issuer's website). Memory 142 may store types of promotions that a user may have downloaded to the device and selected on the device for use. Each promotion may be associated with a button. Or, for example, a user may scroll through a list of promotions on a display on the front of the card (e.g., using buttons to scroll through the list).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
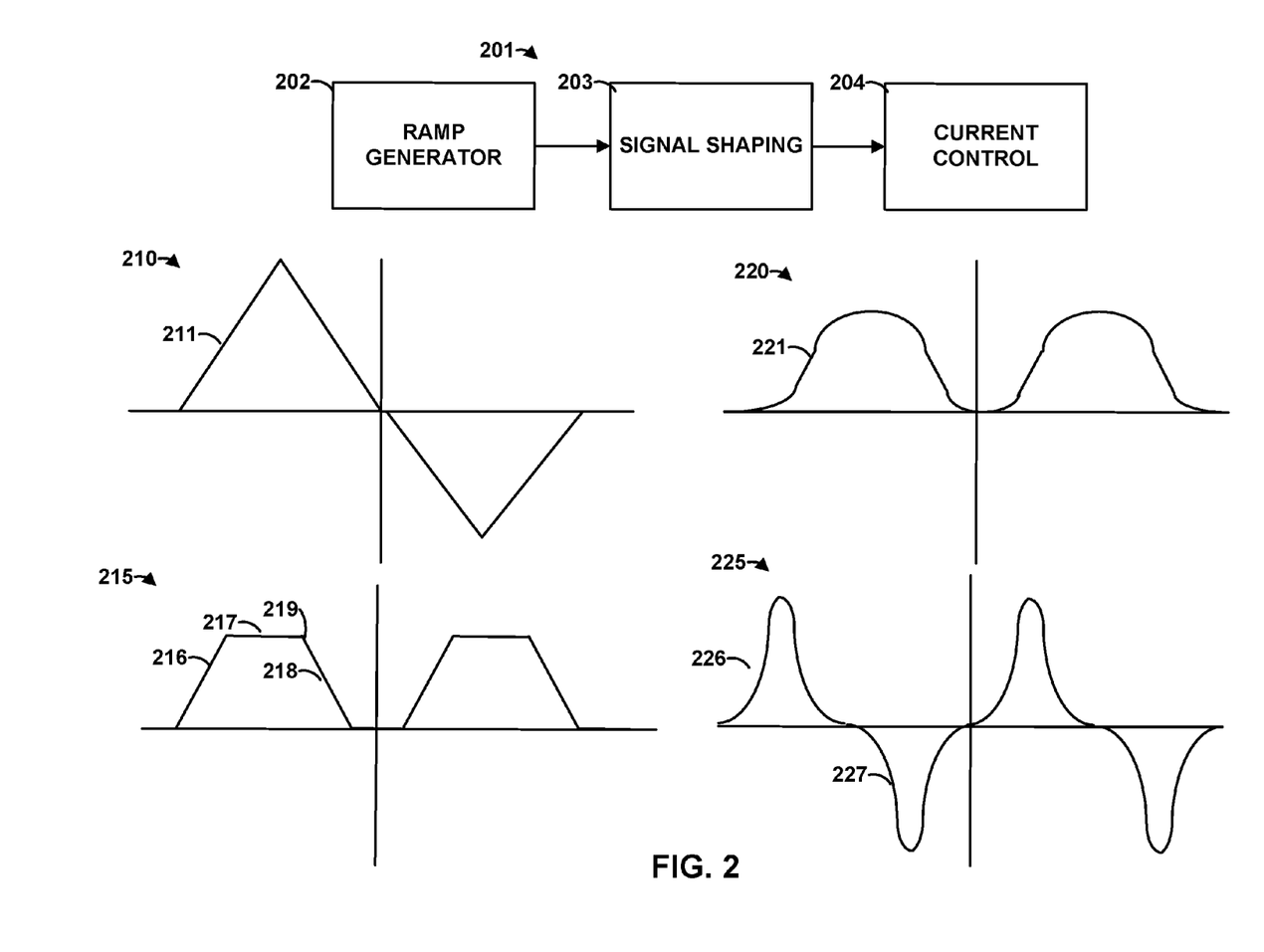
FIG. 2 is an illustration of a process flowchart and waveforms constructed in accordance with the principles of the present invention.

FIG. 2 shows process 201 that may include, for example, ramp generator 202, signal shaping 203, and current control 204. A control signal may be generated by, for example, a microprocessor or other control circuitry. Such a control signal may be utilized by ramp generator 202 to, for example, generate a linear increasing or a linear decreasing signal. The slope of the signal may be pre-determined and stored in memory. The slope of the signal may be changed. For example, the slope of the signal may be different depending on, for example, the environment that is sensed by a card or other device (e.g., a determination by a read-head detector that a particular type of reader is being utilized). The signal produced by ramp generator 202 may also be controlled to produce frequency/double-frequency (F2F) encoded information by the microprocessor. Such information may be shaped by, for example, signal shaping 203. Signal shaping 203 may be utilized to shape the signal produced by ramp generator 202 to provide, for example, a non-linear shape in the signal. Current control circuitry 204 may be utilized, for example, to control the current of the output signal from process 201.

Signal 210 may be provided, for example, from a ramp generator providing a ramp generator signal. The ramp generator may receive, for example, a control signal on when ramp generator should produce an increasing signal, decrease the signal, or leave the output signal steady. The increasing signal may be limited, for example, at a voltage threshold in the positive or negative directions. The decreasing signal may be limited, for example, at a voltage threshold in the positive or negative directions. For example, the ramp may occur in a single polarity or across both the positive and negative polarities.

Signal 215 may be provided, for example, to provide a ramped signal in the positive polarity. The maximum threshold may be, for example, between approximately 2.2 and 3.6 volts (e.g., approximately 2.7 volts). The minimum threshold may be, for example, between approximately 0 and 0.1 volts (e.g., 0 volts). Person skilled in the art will appreciate that the ramp generator may hold a peak for a particular amount of time. For example, the ramp generator may hold a peak at an amount of time greater than it took the predecessor (or successor) ramp to be provided from the ramp generator. In doing so, for example, a cleaner signal may be provided to a read-head of a magnetic stripe reader. Alternatively, for example, the ramp generator may hold a peak at an amount of time less than, or equal to, the time it took the predecessor (or successor) ramp to be provided from the ramp generator. Signal 215 may, for example, be provided as a trapezoidal wave signal.

Signal 220 may be, for example, the shaped signal provided to a current control circuit (e.g., from a signal shaping circuit). The shaped signal may provide, for example, shaped trapezoidal segments (e.g., segment 221) to a current control circuit. A current may then be provided, for example, to a coil of a magnetic emulator from the current control circuitry that is a function, for example, of the voltage provided from the signal shaping circuit. Signal 220 may include, for example, sinusoidal and arctangent signal characteristics beyond the characteristics present in the ramped signal from the ramp generator. More particularly, the shaped signal may smooth and curve the transition points in the ramped signal (e.g., point 219 of signal 215). In doing so, a signal with less noise and ringing may, for example, be provided to a read-head of a magnetic stripe reader. Persons skilled in the art will appreciate that constant voltage portions of a ramp signal (e.g., portion 217 of signal 215) may also provide areas of constant voltage in shaped signal. The areas of constant voltages between a ramp generated signal and a shaped signal, however, may differ in length (e.g., the length of constant voltages in a shaped signal may be shorter).

Signal 225 may be, for example, the change in current with respect to change in time signal received by a read-head of a magnetic stripe reader as a result of receiving a signal from a coil driven by the current signal produced by control circuit 204. Persons skilled in the art will appreciate increases in voltages in signal 220 may result in positive pulses (e.g. pulse 226) of signal 225 and decreases in voltages in signal 220 may result in negative pulses (e.g., pulse 227) in signal 225.

Figure 3:
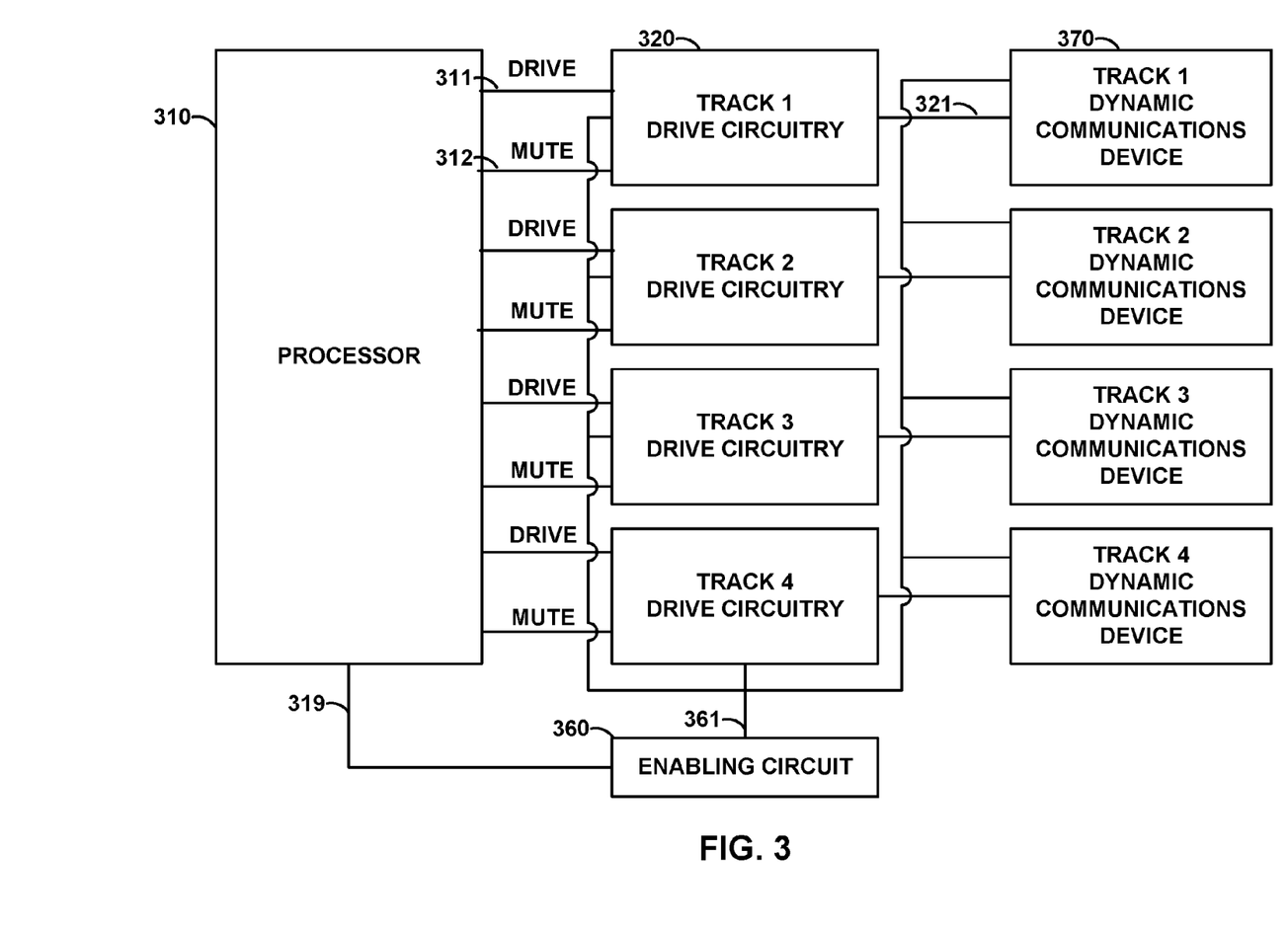
FIG. 3 is an illustration of an architecture constructed in accordance with the principles of the present invention.

FIG. 3 shows processor 310 that provides drive (e.g., signal 311) and mute signals (e.g., signal 312) to drive circuitry (e.g., drive circuitry 320) as well as control signals (e.g., signal 319) to enabling circuitry 360. Drive circuitry may provide dynamic magnetic communications device drive signals (e.g., signal 321) to dynamic magnetic communications devices (e.g., device 370). A different drive circuit may be utilized, for example, for a different dynamic magnetic communications device (e.g., a different emulator, having a coil, for communicating a different track of magnetic stripe data). A different processor may provide, for example, drive and mute signals to such different drive circuit.

A drive circuit may include, for example, a ramp generator circuit (e.g., ramp generator 202 of FIG. 2), signal shaping circuit (e.g., signal shaping circuit 203 of FIG. 3), and current control circuit (e.g., current control circuit 204 of FIG. 2). Drive circuitry (e.g., drive circuitry 320) may provide a shaped signal to a dynamic magnetic stripe communications device (e.g., device 370). Similarly, for example, enabling circuitry 360 may provide enabling signals (e.g., signals 361) to, for example, drive circuitry and dynamic magnetic stripe communication devices.

A single processor may be utilized, for example, to control one, two, three, or four drive circuits and magnetic emulators for communication of separate tracks of magnetic stripe data. A single enabling circuit may be utilized to enable, for example, one, two, three, or four magnetic emulators. For example, a single enabling circuit may be utilized to enable two magnetic emulators while a single processor may be utilized to provide control and mute signals to drive two circuits (e.g., one for each emulator). Alternatively, more than one processor may be utilized, for example, to control separate drive circuits and more than one enabling circuit may be utilized to enable separate magnetic emulators.

Figure 4:
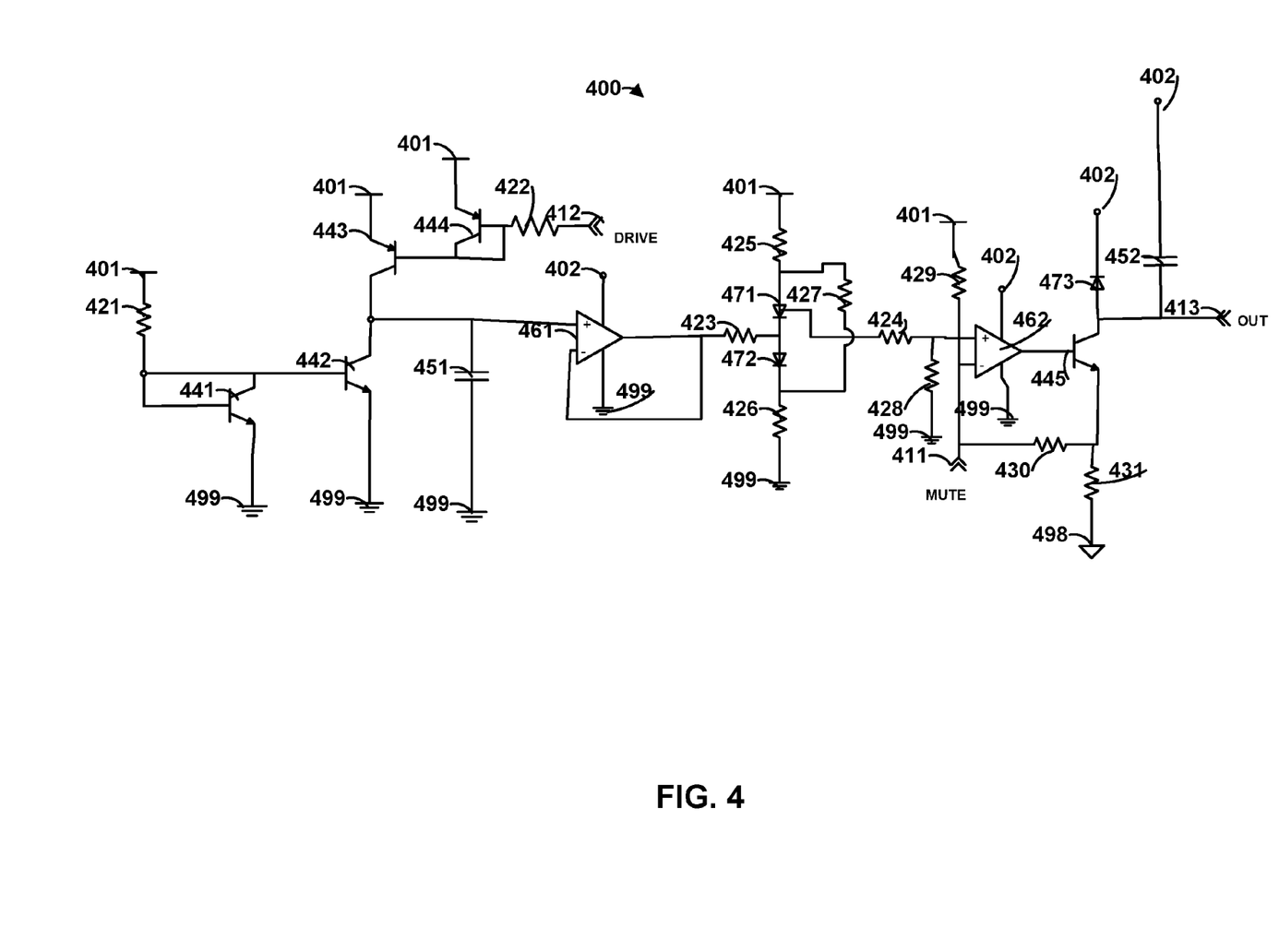
FIG. 4 is a schematic of a circuit constructed in accordance with the principles of the present invention.

FIG. 4 may include circuitry 400 that may include, for example, first source voltage 401, second source voltage 402, ground 499, drive signal 412, mute signal 411, output signal 413, transistors 441-445, capacitors 451 and 452, resistors 421-431, diodes 471-473, and operational amplifiers 461 and 462. Persons skilled in the art will appreciate that circuitry 400 may be utilized as a drive circuit for communicating a track of magnetic stripe data through a magnetic emulator. A magnetic emulator may include, for example, an inductor such as a coil. Such a coil may be fabricated, for example, on a flexible, printed circuit board such as a multiple-layer flexible, printed circuit board.

Capacitor 451 may have approximately, for example, between 1800 and 3500 pF (e.g., approximately 2200 pF). Capacitor 451 may be utilized, for example, to control the width of pulses in a signal received by a read-head of a magnetic stripe reader (e.g., the width of pulse 226 of signal 225 of FIG. 2).

Drive signal 412 may be provided, for example, from a processor. A ramp generator circuit may be provided that may include, for example, resistors 421 and 422, transistors 441-444, capacitor 451, and operational amplifier 461.

The ramp generator circuit may include operational amplifier 461, which may serve as an impedance buffer for the output of the ramp generator circuit. Accordingly, for example, the voltage across capacitor 451 may not be loaded by subsequent circuitry. Transistors 443 and 444 may, for example, be coupled to form a temperature compensated constant current source. The current level may be defined, for example, by resistor 422. The input signal (e.g., drive signal 412) may be, for example, either grounded (e.g., at zero voltage equal to ground 499) or left floating (e.g., open collector active pull-down driven). The resulting constant current may be, for example, selectively applied to capacitor 451, whose voltage may then be linearly increased when desired to form a positive going ramp reaching, but not exceeding, for example, supply voltage 401.

A microprocessor may be configured to provide the characteristics of a ramp generator, shaping signal circuit, as well as a current control circuit. Alternatively, for example, such ramp generator, shaping signal, and current control circuits may be provided on an ASIC or multiple ASICs. Multiple drive circuits may be provided on an ASIC. For example, a single ASIC may provide two or three drive circuits which, in turn, may be utilized to cause two or three, respectively, dynamic magnetic communications devices (e.g., magnetic emulators) to communicate different tracks of data to a read-head of a magnetic stripe reader.

Transistors 441 and 442 may be coupled, for example, to form a temperature compensated constant current sink with a current level defined by resistor 421. The circuit comprising transistors 441 and 442 may, for example, consistently draw a constant current which, in turn, may deplete the charge on capacitor 451 when the current source from transistors 443 and 444 is inoperative and deducts from the sourced current when the current source from transistors 443 and 444 is operative.

The current source created by transistors 443 and 444, for example, may deliver approximately twice the current utilized by the current sink created by 441 and 442. This may be achieved, for example, by setting resistor 421 to approximately twice the value of resistor 422. As a result, for example, the state of input 412 may define whether capacitor 451 is charged or depleted by matched current values of opposing sign. The result, for example, may be an output of positive going or negative going linear ramps of equal, but opposite sign slope.

A signal shaping functionality may be applied to, for example, the signal produced by the ramp generator circuit. Accordingly, for example, a signal shaping circuit may be provided and may include, for example, resistors 423-428 and diodes 471-472. The ramp signal from the ramp circuit may be provided to, for example, resistor 423. The resulting shaped signal from the shaping circuit may be provided, for example, at the common point between resistors 424 and 428.

The signal shaping circuit may include diodes 471 and 472. The signal shaping circuit may include additional diodes. Such diodes may be biased to impart their linear characteristics onto the signal being received by the shaping circuit. Resistors 423-426 and 428 may be bias resistors that are selected to provide a smooth transition from, for example, the zero volt level through to the reference voltage 401 beginning with a slope of approximately zero volts/second and finishing with a slope of approximately zero volts/second. The resultant shape may be similar to, for example, approximately an arctangent curve. The resistor pair 424 and 438 may present, for example, a portion of the resulting shaped signal to the positive terminal of operational amplifier 462.

A current control functionality may be applied to, for example, the signal produced by the signal shaping circuit. Accordingly, for example, a current control circuit may be provided and may include, for example, resistors 429-431, operational amplifier 462, transistor 445, capacitor 452 and diode 473. The shaped signal from the signal shaping circuit may be provided to, for example, the positive terminal of operational amplifier 462, which is operable to control the level of current at output 413. The current from output 413 may, for example, be passed through a magnetic emulator (e.g., through a coil) connected between output 413 and a positive supply voltage (e.g., supply voltage 402). The coil may be utilized to serial transmit a track of magnetic stripe data.

Operational amplifier 462 and feedback resistor 430 may control, for example, the collector-base current of transistor 445 so as to establish a voltage across sense resistor 431 related to the incoming signal. In this manner, the current drawn through a coil of a magnetic emulator, for example, may be precisely controlled.

Resistor 429 may, for example, provide an offset such that the driven current corresponding to the zero volt level of the signal input comes close to approximately, but does not reach, zero milliamps. For example, the current may be, for example, limited to approximately 2-3 milliamps (e.g., approximately 2 milliamps). Accordingly, transistor 445 may remain active and not shut-off, thereby avoiding, for example, non-linear and abrupt changes in current that are undesirable in the final output signal.

Resistor 431 may be, for example, a sense resistor. Resistor 431 may be selected, for example, so as to scale the current to levels needed to operate a dynamic magnetic stripe communications device. The current associated with the maximum input signal (e.g., at reference voltage 401) may have, for example, a range between 50-100 milliamps. Alternatively, for example, the current may be above or below this range.

A dynamic magnetic stripe communications device may, for example, be provided between output 413 and supply voltage 402. A high pass filter may be provided. Such a high pass filter may include, for example a capacitor such as capacitor 452. Such a high pass filter may, for example, prevent abrupt signal changes that include high frequency components from reaching the dynamic magnetic stripe communications device.

Diode 473 may be provided. Diode 473 may provide back-EMF protection for the drive circuitry when, for example, the output drives an inductive load.

An auxiliary control signal may be provided, for example, to provide a mute functionality. Such a mute signal (e.g., signal 411) may be utilized to force the drive current, for example, to zero amperes (e.g., if pulled up). The signal, for example, may be left floating as needed during normal feedback control. The muting functionality may be utilized, for example, to silence a dynamic magnetic stripe communications device during power-up and power-down of the drive circuits. When not in use, for example, the power may be removed from these circuits to increase battery life. During a power transition, however, undesirable signals/pulses may be generated. The muting functionality may be utilized to prevent such undesirable signals/pulses.

A sequence may include, for example, holding the mute signal high, applying power to the drive circuits, releasing the mute signal, driving data to the dynamic magnetic stripe communications device, pulling the mute signal high, removing power from the drive circuits, and setting circuitry for optimum low-power stand-by operation.

Figure 5:
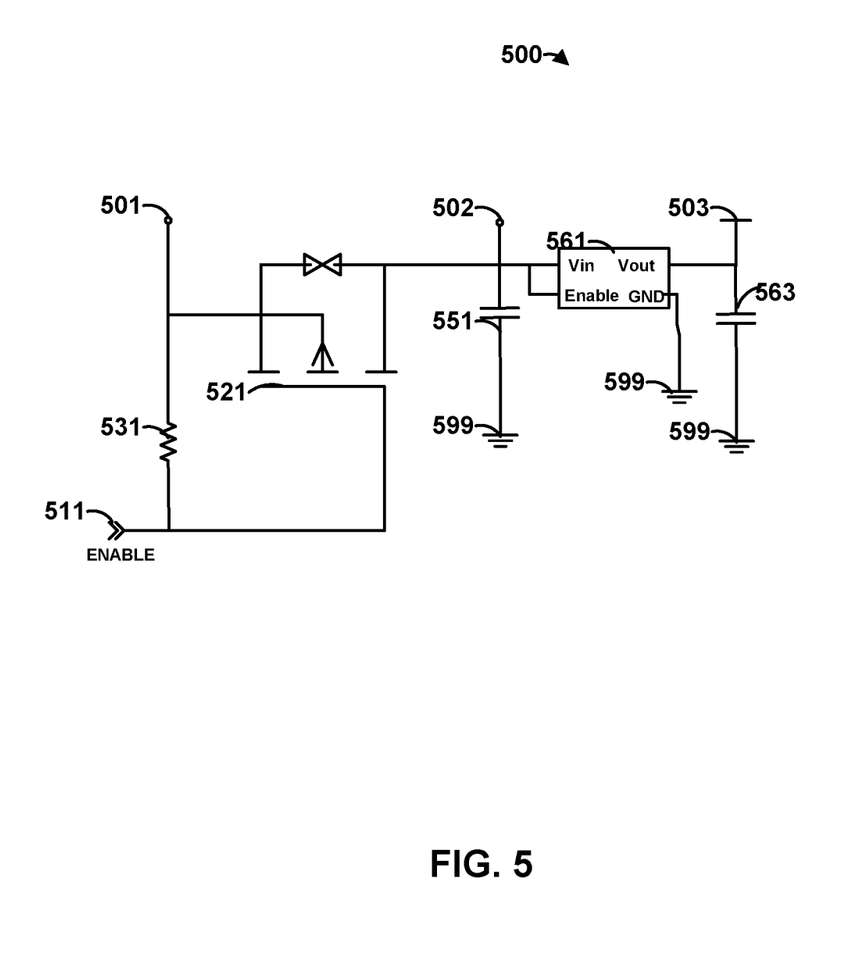
FIG. 5 is a schematic of a circuit constructed in accordance with the principles of the present invention.

Persons skilled in the art will appreciate that low-power operation may be optimized. FIG. 5 shows power control circuit 500 that may include, for example, enable circuitry 511, resistor 531, switching component 521, component 561, capacitors 551-563, source voltages 501, 502, and 503, and ground 599.

Switching component 521 may be, for example, a MOSFET. Switching component 521 may be used to, for example, switch current and therefore power from a power supply that may be a battery (e.g., power source 501). A MOSFET may be utilized as a switching component, for example, that has a low series resistance in an ON mode. A control signal (e.g., signal 511), which may be supplied by a microprocessor or other circuit, may be utilized to turn ON or OFF switching component 521.

Persons skilled in the art will appreciate that power usage may be minimized by, for example, providing control signal 511 in a high-impedance state (floating) when switching device 521 is to be in the OFF state. For this reason, for example, resistor 531 is provided to hold switching device 521 in the OFF state.

The output of switching device 521 may, for example, supply the VCC power to the output stages of the current control circuit of circuit 400 of FIG. 4 as well as, for example, the operational amplifiers of circuit 400 of FIG. 4. Additionally, for example, power may be supplied to additional circuits utilizing reference voltages.

A reference voltage (e.g., voltage 401 of FIG. 4 and voltage 503 of FIG. 5) may be provided, for example, by a voltage regulator (e.g., component 561 of FIG. 5). A reference voltage may, for example, remove the dependence on a supply voltage (e.g., voltage 402 of FIG. 4). The supply voltage may vary in cases where, for example, a battery is utilized as the overall power source and the battery may discharge through use.

A low drop-out (LDO) linear regulator may be utilized as a voltage regulator. Zener diode circuits may also be utilized. A resulting voltage reference may be filtered by, for example, capacitor 563 or other circuits. The voltage reference may be provided, for example, at a point below the minimum possible supply voltage. Accordingly, a battery may be provided and discharged to approximately 2.8 volts. Accordingly, a reference voltage may be provided at approximately 2.7 volts. Accordingly, the difference between a supply voltage and reference voltage may be between 0.2 volts and 0.5 volts (e.g., approximately 0.1 volts).

A signal shaper circuit may, for example, utilize any number of diodes (e.g., approximately 9 diodes) and bias resistors to provide a more precise implementation of an arctangent waveform. Additional diodes may introduce, for example, additional breakpoints in a piecewise approximation of the desired waveform. Resistors 425, 427, and 426 may, for example, be replaced with two adjustable voltage references, which may be different from voltage 401 (e.g., half of voltage of voltage 401 and/or may differ from voltage 401 by approximately 0.5-1.5 or 1 volts).

The current drive may be, for example, provided by replacing the operational amplifier with one or more individual transistors in an open loop control configuration. Persons skilled in the art will appreciate that transistors may be, for example, replaced with MOSFETs (e.g., in circuit 400 of FIG. 4). The operational amplifier in a ramp generator circuit may, for example, be replaced with a pair of transistors in a push-pull arrangement.

Figure 6:
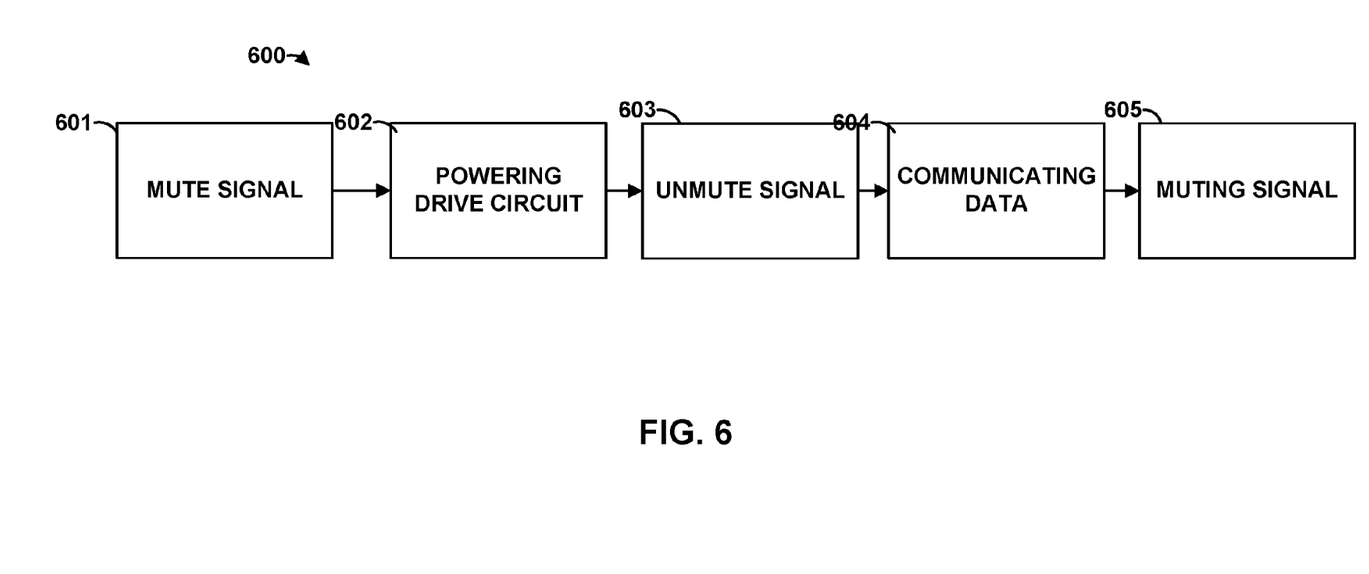
FIG. 6 is an illustration of a process flow chart constructed in accordance with the principles of the present invention.

FIG. 6 shows a sequence to communicate magnetic stripe data to a magnetic stripe reader. The sequence may include, for example, holding the mute signal high (e.g., step 601 of FIG. 6), applying power to the drive circuits (e.g., step 602 of FIG. 6), releasing the mute signal (e.g., step 603 of FIG. 6), driving data to the dynamic magnetic stripe communications device (e.g., step 604 of FIG. 6), pulling the mute signal high (e.g., step 605 of FIG. 6), removing power from the drive circuits, and setting circuitry for optimum low-power stand-by operation. All or a portion of the process may be repeated multiple times such that a card may be swiped multiple times at a magnetic stripe reader. Read-head detectors may be provided on a card to determine if, for example, a card is being re-swiped at a magnetic stripe reader. Low-power stand-by operation may include, for example, placing a microprocessor in a sleep mode. A microprocessor may be awakened from sleep mode, for example, by a card (or other device) receiving manual input from a user. For example, a user may press a button on a card to select a feature, the microprocessor may be awakened from sleep mode, and magnetic stripe data may be communicated by a drive circuit and dynamic magnetic stripe communications device to a magnetic stripe reader when circuitry on the card determines that dynamic magnetic stripe communications device is within the proximity of a read-head of a magnetic stripe reader to communicate magnetic stripe data (e.g., via one or more magnetic stripe read-head detectors provided on the card or other device).

Persons skilled in the art will appreciate that a boost circuit may be provided. A battery (e.g., a battery having approximately 3.6 volts for normal operation) may be supercharged to a higher voltage (e.g., approximately 3.8 to 4.5 volts such as approximately 4.2 volts). The microprocessor, however, may not be able to directly utilize the voltage from a supercharged battery. As a result, for example, a boost circuit may be provided to step down the voltage of a supercharged battery to a level that may be utilized by a microprocessor. The boost circuitry may determine when the battery discharges past a particular threshold (e.g., to a voltage suitable to directly power a microprocessor) so that the boost circuitry may stop stepping down the voltage of the battery. The boost circuitry may also change the voltage the battery is stepped down. Accordingly, for example, as the voltage supplied by a battery decreases, the boost circuitry may decrease the amount of voltage the battery is stepped down. In doing so, additional power may be obtained from a battery without, for example, damaging the microprocessor or causing the microprocessor to malfunction.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A method, comprising:
supplying a first mute signal to a first drive circuit;
applying power to the first drive circuit after the supplying a first mute signal;
releasing the first mute signal;

supplying a first drive signal to a first wireless communications device;
supplying a second mute signal to a second drive circuit;
applying power to the second drive circuit after the supplying a second mute signal;
releasing the second mute signal; and
supplying a second drive signal to a second wireless communications device.

2. The method of claim 1, further comprising:
detecting a reader;
supplying a third mute signal to the first drive circuit; and
removing power from the first drive circuit after the supplying a third mute signal,
wherein the supplying a first mute signal and the supplying a second mute signal are in response to the detecting a reader.

3. The method of claim 1, further comprising:
setting circuitry for low-power operation.

4. The method of claim 1, further comprising:
detecting a reader;
supplying a third mute signal to the first drive circuit;
removing power from the first drive circuit after the supplying a third mute signal; and
setting circuitry for low-power operation,
wherein the supplying a first mute signal and the supplying a second mute signal are in response to the detecting a reader.

5. The method of claim 1, further comprising:
detecting a reader,
wherein the supplying a first mute signal and the supplying a second mute signal are in response to the detecting a reader.

6. The method of claim 1, wherein the supplying a first drive signal to a first wireless communications device further comprises supplying the first drive signal to a dynamic magnetic stripe device.

7. The method of claim 1, further comprising wirelessly communicating data via an antenna.

8. The method of claim 1, further comprising wirelessly communicating data via an antenna connected to an IC chip.

9. The method of claim 1, further comprising wirelessly communicating data via an RFID antenna.

10. The method of claim 1, further comprising wirelessly communicating data via a coil.

11. A device, comprising:
a first wireless communications device;
a second wireless communications device;
a first drive circuit operable to provide a first drive signal to the first wireless communications device based on a first input signal and a first mute signal;
a second drive circuit operable to provide a second drive signal to the second wireless communications devices based on a second input signal and a second mute signal; and
a processor.

12. The device of claim 11, further comprising a control circuit operable to provide a power control signal to the first drive circuit.

13. The device of claim 11, further comprising a control circuit operable to provide a power control signal to the first drive circuit and the second drive circuit.

14. The device of claim 11, further comprising a control circuit operable to provide a power control signal to the first wireless communications device.

15. The device of claim 11, further comprising a control circuit operable to provide a power control signal to the first wireless communications device and the second wireless communications device.

16. The device of claim 11, wherein the processor is operable to provide the first input signal and the first mute signal to the first drive circuit.

17. The device of claim 11, wherein the processor is operable to provide the first input signal and the first mute signal to the first drive circuit, and the second input signal and the second mute signal to the second drive circuit.

18. The device of claim 11, further comprising:
a third drive circuit operable to provide a third drive signal to a third wireless communications device based on a third input signal and a third mute signal; and
a control circuit operable to provide a power control signal to the first drive circuit, the second drive circuit, the third drive circuit, the first wireless communications device, the second wireless communications device, and the third wireless communications device,
wherein the processor is operable to communicate the first input signal and the first mute signal to the first drive circuit, the second input signal and the second mute signal to the second drive circuit, the third input signal and the third mute signal to the third drive circuit, and a control signal to the control circuit.

19. The device of claim 11, further comprising:
a third drive circuit operable to provide a third drive signal to a third wireless communications device based on a third input signal and a third mute signal,
wherein the processor is operable to communicate a first power control signal, the first input signal, and the first mute signal to the first drive circuit, a second power control signal, the second input signal, and the second mute signal to the second drive circuit, and a third power control signal, the third input signal, and the third mute signal to the third drive circuit.

20. The device of claim 11, further comprising:
a third drive circuit operable to provide a third drive signal to a third wireless communications device based on a third input signal and a third mute signal,
wherein the processor is operable to communicate a first power control signal, the first input signal, and the first mute signal to the first drive circuit, a second power control signal, the second input signal, and the second mute signal to the second drive circuit, a third power control signal, the third input signal, and the third mute signal to the third drive circuit, a fourth power control signal to the first wireless communications device, a fifth power control signal to the second wireless communications device, and a sixth power control signal to the third wireless communications device.

* * * * *